(12) United States Patent
Nguyen et al.

(10) Patent No.: US 12,051,289 B2
(45) Date of Patent: Jul. 30, 2024

(54) CLOUD-BASED ACOUSTIC MONITORING, ANALYSIS, AND DIAGNOSTIC FOR POWER GENERATION SYSTEM

(71) Applicant: General Electric Company, Schenectady, NY (US)

(72) Inventors: Quoc Hoai Nguyen, Houston, TX (US); Arkadiusz Bartlomiej Nagorski, Lesznowola (PL); Dinesh Venugopal setty, Bangalore (IN); Richard Lynn Loud, Ballston Spa, NY (US); Luong Tran Mortellaro, Houston, TX (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 664 days.

(21) Appl. No.: 17/143,561

(22) Filed: Jan. 7, 2021

(65) Prior Publication Data

US 2022/0068057 A1    Mar. 3, 2022

Related U.S. Application Data

(66) Substitute for application No. 17/011,696, filed on Sep. 3, 2020, now abandoned.

(30) Foreign Application Priority Data

Dec. 17, 2020    (PL) .......................................... 436374

(51) Int. Cl.
*H04R 29/00*    (2006.01)
*F01D 21/04*    (2006.01)
(Continued)

(52) U.S. Cl.
CPC ......... *G07C 5/0833* (2013.01); *F01D 21/045* (2013.01); *G01N 29/14* (2013.01);
(Continued)

(58) Field of Classification Search
CPC .... H04R 29/00; H04R 29/005; H04R 29/008; H04R 1/406; H04R 3/005
(Continued)

(56) References Cited

U.S. PATENT DOCUMENTS 5,386,689 A    2/1995    Bozich et al.
6,668,655 B2    12/2003    Harrold et al.
(Continued)

FOREIGN PATENT DOCUMENTS

WO    2014120300 A3    10/2014
WO    2015065873 A2    5/2015

OTHER PUBLICATIONS

European extended Search Report for EP Application No. 21212970.4 dated May 19, 2022; 9 pgs.
(Continued)

*Primary Examiner* — Disler Paul
(74) *Attorney, Agent, or Firm* — Fletcher Yoder, P.C.

(57)    ABSTRACT

A system includes an acoustic monitoring, analysis, and diagnostic system having a processor. The processor is configured to receive NF noise signals from a near field (NF) microphone array, the NF microphone array measures noises from a power generation system in a NF. The processor is configured to receive FF noise signals from a far field (FF) microphone array, the FF microphone array measures noises from a power generation system in a FF. The processor is configured to derive NF and FF noise measurements based on the signals and to synchronize the NF and FF noise measurements to create synchronized NF and FF noise data. The processor is configured to analyze the synchronized NF and FF noise data to create a NF and an FF noise signature. The processor is configured to diagnose root causes of noises generated from the power generation system and to report the root causes.

22 Claims, 5 Drawing Sheets

(51) Int. Cl.
  *G01N 29/14* (2006.01)
  *G07C 5/08* (2006.01)
  *H04R 1/40* (2006.01)
  *H04R 3/00* (2006.01)

(52) U.S. Cl.
  CPC ..... *H04R 29/005* (2013.01); *G01N 2291/044* (2013.01); *H04R 1/406* (2013.01); *H04R 3/005* (2013.01)

(58) Field of Classification Search
  USPC .............................................. 381/56, 58–59
  See application file for complete search history.

(56) References Cited

U.S. PATENT DOCUMENTS

| | | | |
|---|---|---|---|
| 6,741,919 B1 | 5/2004 | Schuster et al. | |
| 8,442,833 B2 * | 5/2013 | Chen | G10L 25/78 704/270.1 |
| 8,565,999 B2 | 10/2013 | Bunce et al. | |
| 9,388,753 B2 | 7/2016 | Prochaska et al. | |
| 11,483,651 B2 * | 10/2022 | Rämö | G10L 21/0208 |
| 11,499,954 B2 * | 11/2022 | Chadha | G01N 33/0065 |
| 2005/0244013 A1 | 11/2005 | Battenberg et al. | |
| 2007/0031237 A1 | 2/2007 | Bonnet | |
| 2012/0330499 A1 | 12/2012 | Scheid et al. | |
| 2014/0120300 A1 | 5/2014 | Persaud | |
| 2015/0065873 A1 | 3/2015 | Tsukerman et al. | |
| 2015/0168228 A1 | 6/2015 | Desilva | |
| 2018/0011059 A1 * | 1/2018 | Trayhan, Jr. | G01N 29/14 |
| 2022/0018895 A1 * | 1/2022 | Sairiala | G01R 31/2825 |
| 2022/0351600 A1 * | 11/2022 | Ogawa | G06V 20/52 |
| 2023/0224655 A1 * | 7/2023 | Kawagoe | H04R 3/005 702/183 |

OTHER PUBLICATIONS

Graham L J et al.: "Acoustic Emission Monitoring of Steam Turbines: a Review of Progress", Proceedings: Epri Incipient-Failure Detection Conference, XX, XX, Feb. 1986 (1986-02), pp. 3-81, XP008003866.

* cited by examiner

CLOUD-BASED ACOUSTIC MONITORING, ANALYSIS, AND DIAGNOSTIC FOR POWER GENERATION SYSTEM

CROSS REFERENCE TO RELATED APPLICATIONS

This application claims priority from and the benefit of Poland Patent Application No. P.436374, entitled "CLOUD-BASED ACOUSTIC MONITORING, ANALYSIS, AND DIAGNOSTIC FOR POWER GENERATION SYSTEM," filed Dec. 17, 2020, which is herein incorporated by reference in its entirety.

BACKGROUND

The subject matter disclosed herein relates generally to a cloud-based monitoring, analysis, and diagnostic system for a power generation system using acoustic sensing technology.

Power generation system is a system that converts primary sources of energy into a secondary energy source, the electricity. The primary sources of energy may include fossil fuels (such as coal, crude oil, and natural gas), hydraulic forces (such as running water from a dam), nuclear reaction, wind, solar and geothermal energy, and so on. In many regions, a large portion of electricity is generated from electric power plant that use turbines or similar machines to drive electric generators. A turbine generator system uses a moving fluid (such as water, steam, combustion gases, or air) to pushes a series of blades mounted on a shaft, which rotate the shaft connected to an electric generator. The electric generator, in turn, converts the kinetic energy into electrical energy based on the relationship between magnetism and electricity. Different types of turbines include steam turbines, combustion (gas) turbines, water (hydroelectric) turbines, and wind turbines.

During the operations of a turbine generator system, excessive noises may be generated from various moving objects (such as mechanical parts and fluids) or other physical events (such as resonances). Some noises may cause environmental problems, for example, complaints from the neighbors. Some noises may indicate potential problems that may lead to system/component failure, if not being addressed timely or properly. Therefore, noises generated from the turbine generator system need to be monitored closely.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a system is provided. The system includes an acoustic monitoring, analysis, and diagnostic system that includes a processor. The processor receives NF noise signals from a near field (NF) microphone array that measures noises generated from a power generation system in a near field, and also receives FF noise signals from a far field (FF) microphone array that measures noises generated from a power generation system in a far field. Based on the received signals, the processor derives NF noise measurements and FF noise measurements. The processor also synchronizes the NF noise measurements and the FF noise measurements to create synchronized NF noise data and synchronized FF noise data, which are analyzed by the processor to create a NF noise signature and an FF noise signature. Based on the NF noise signature and FF noise signature, the processor diagnoses one or more root causes of noises generated from the power generation system and reports the one or more root causes of the noises generated from the power generation system.

In a second embodiment, a method is provided. In accordance with this method, an acoustic monitoring, analysis, and diagnostic system measures noises generated from a power generation system and traveling in the near field via a near field (NF) microphone array and receives NF noise signals from the NF microphone array. The acoustic monitoring, analysis, and diagnostic system also measures noises generated from the power generation system and traveling in the far field via a far field (FF) microphone array and receives FF noise signals from the FF microphone array. Based on the NF signals and the FF signals, the acoustic monitoring, analysis, and diagnostic system derives NF noise measurements and FF noise measurements. The acoustic monitoring, analysis, and diagnostic system synchronizes the NF noise measurements and the FF noise measurements into synchronized NF noise data and synchronized FF noise data. Based on the NF noise measurements and FF noise measurements, the acoustic monitoring, analysis, and diagnostic system monitors noise performance of the power generation system. The acoustic monitoring, analysis, and diagnostic system also analyzes the synchronized NF noise data and the synchronized FF noise data to create NF noise signature and FF noise signature, based on which the acoustic monitoring, analysis, and diagnostic system diagnoses root causes of the measured noises generated from the power generation system. Further, the acoustic monitoring, analysis, and diagnostic system controls the NF microphone array and FF microphone array to measure the noise continuously to generate continuous recorded acoustic signals that provide continuous monitoring of collected data to recognize a change for early failure detection based on the analysis of historical data over the life time of the monitored power generation system.

In a third embodiment, a non-transitory, computer-readable medium storing instructions is provided. The instructions, when executed by one or more processors, cause the one or more processors to control a near field (NF) microphone array to measure noises generated from a power generation system, and to receive NF noise measurements from the NF microphone array. The instructions also cause the one or more processors to control a far field (FF) microphone array to measure noises generated from the power generation system, and to receive FF noise measurements from the FF microphone array. The instructions also cause the one or more processors to synchronize the NF noise measurements and FF noise measurements to create synchronized NF noise data and synchronized FF noise data. The instructions also cause the one or more processors to monitor noise performance of the power generation system based on the measured noises from the NF microphone array and FF microphone array. The instructions also cause the one or more processors to analyze the synchronized NF noise data and synchronized FF noise data to create NF noise signature and FF noise signature. The instructions also cause the one or more processors to diagnose root causes of the measured noises generated from the power generation system based on the NF noise signature and FF noise signature. The instructions further cause the one or more processors to control the near field (NF) microphone array and far field (FF) microphone array to measure the noise continuously to generate continuous recorded acoustic signals that enable continuous monitoring of collected data to recognize change(s) for early failure detection based on the analysis of historical data over the life time of the monitored power generation system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
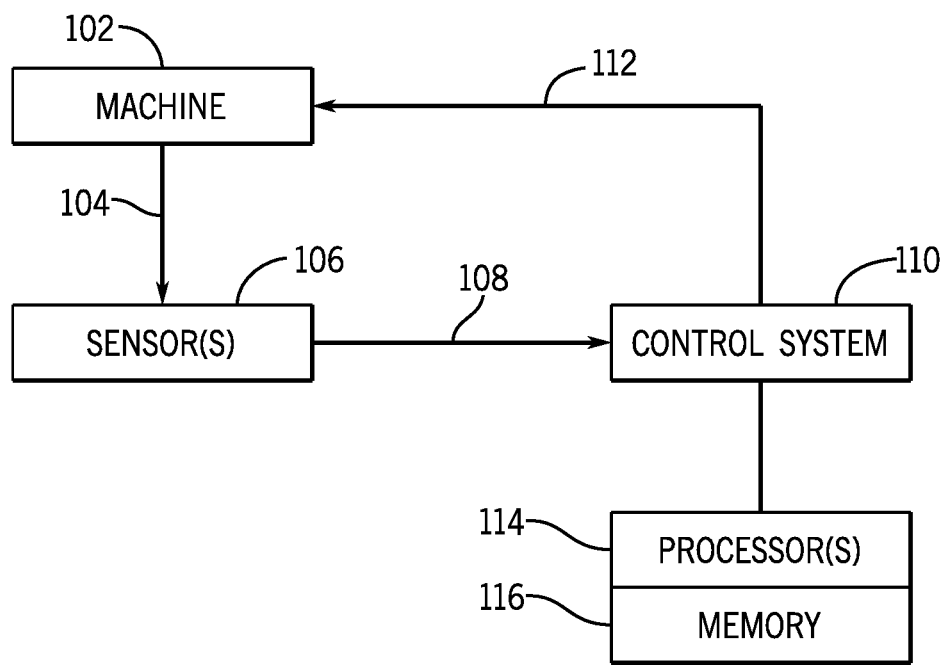
FIG. 1 is a block diagram depicting an embodiment of a control system operatively coupled to a machine, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Power generation systems may be used to convert different energy sources into electrical power. The energy sources may be hydrocarbonaceous, coal, natural gas, nuclear, solar, wind energy, and so on. In some power production systems, gas turbine systems may combust hydrocarbonaceous fuel for the generation of electricity. The gas turbine systems may include compressor(s), a combustor, gas turbine(s), and an electric generator. Gas turbines are engines used for producing rotary movement to turn electric generators. The gas turbines may combust natural gas or other hydrocarbonaceous fuels to produce mechanical motion, which may then be used to drive the electric generators to produce electrical energy. More specifically, the gas turbines combust a mixture of air and fuel in combustors, where the combustions of the air-fuel mixture create hot pressurized gases that may cause turbine blades to spin a shaft coupling the gas turbine engine to one or more electrical generators, thus driving the generators which in turn convert rotational motion into electricity. Some gas turbine systems may generate unwanted noises. For example, high noise levels may indicate issues that may lead to unwanted maintenance. But the causes of noises may not be easy to identify.

During operations, operators of the power generation system may benefit from quick response and systems for failure prediction based on noise detections. Automated systems and operators may also benefit from monitoring a power system performance at various operating conditions locally (e.g., from an onsite control room), and/or remotely (e.g., from a network or cloud). In certain operations, the automated systems and/or operators may check for noise performance from both near field by using sensors deployed close to the power generation system, and from far field by using sensors deployed far from the power generation system. For example, the automated systems and/or operators may benefit from far field observations that minimize environmental noise pollution.

The techniques disclosed herein includes a cloud-based acoustic monitoring, analysis, and diagnostic (CAMAD) system, which may additionally include hardware and/or software used to monitor remotely noise performance of a power generation system in both near field and far field. The CAMAD system may provide root cause analysis using system and component noise signatures at both near field and far field. Besides convenient access at various locations (locally or remotely), the CAMAD system may be used to detect problems early to prevent costly repair, to predict component failure and to avoid service interruption.

Turning now to the drawings, FIG. 1 is a block diagram depicting an embodiment of a machine that may be controlled via a control system. In the depicted embodiment, a machine 102 is operatively coupled to a control system 110 so that the machine 102 may be controlled by the control system 110 to perform instructed operations. One or more sensors 106 may be deployed to monitor operational performance of the machine 102, of ambient conditions, of related systems, and so on, to provide information to the control system 110, which may then further analyze and process the received information and create control signal(s) to the machine 102 to perform intended operation(s), for example via actuators such as valves, fuel throttles, pumps, positioners, and so on.

The machine 102 may be a mechanical system that may use and/or produce power to apply forces and to control movement based on the instructed operations. During operations, the machine 102 may generate certain physical events or changes 104, such as sound, motion (e.g., vibration or displacement), heat, moisture, pressure, electromagnetic field, light or chemical substance, etc. The physical events or changes 104 may be detected by the sensor(s) 106. The output from the sensor 104 may be one or more signals 108, which may be used by the control system 110 and/or converted to be displayed by a human-readable display. The sensor(s) 106 may be a device, module, or sensor system that may detect and/or respond to various changes in the physical environment and/or the machine 102. For example, the sensor(s) 106 may be acoustic sensors, motion sensors, thermal sensors, pressure sensors, radio-frequency sensors, optical sensors, chemical sensors (e.g., ozone sensors), and the like.

The control system 110 may include one or more processors 114 that may receive the signals 108 from the sensor(s) 106. If the signals 108 include analog signals, an analog-to-digital converter may be used to convert the analog signal(s) to digital signal(s) that may then be further used by the processor(s) 114. The processor(s) 114 may analyze and process the receive signal(s), and output control signal(s) 112 based on results from data analysis and processing. The control system 110 may also include memory device(s) 116 to store data including computer code or instructions that may execute various processes related to signal analysis and processing. The memory devices(s) 116 may include random access memory (RAM), read only memory (ROM), storage devices (e.g., hard drives, USB sticks), and/or storage systems (e.g., relational databases, non-relational databases). The control system 110 may further include monitoring and alarming/warning systems, including human machine interface (HMI) systems, displays, audio systems, and so on, that may that enable users to enter inputs into the control system 110 and to monitor the operational performance of the machine 102. The control system 110 may be a local control system (e.g., located in an onsite control room), a network-based control system, cloud-based systems, or a combination thereof.

Figure 2:
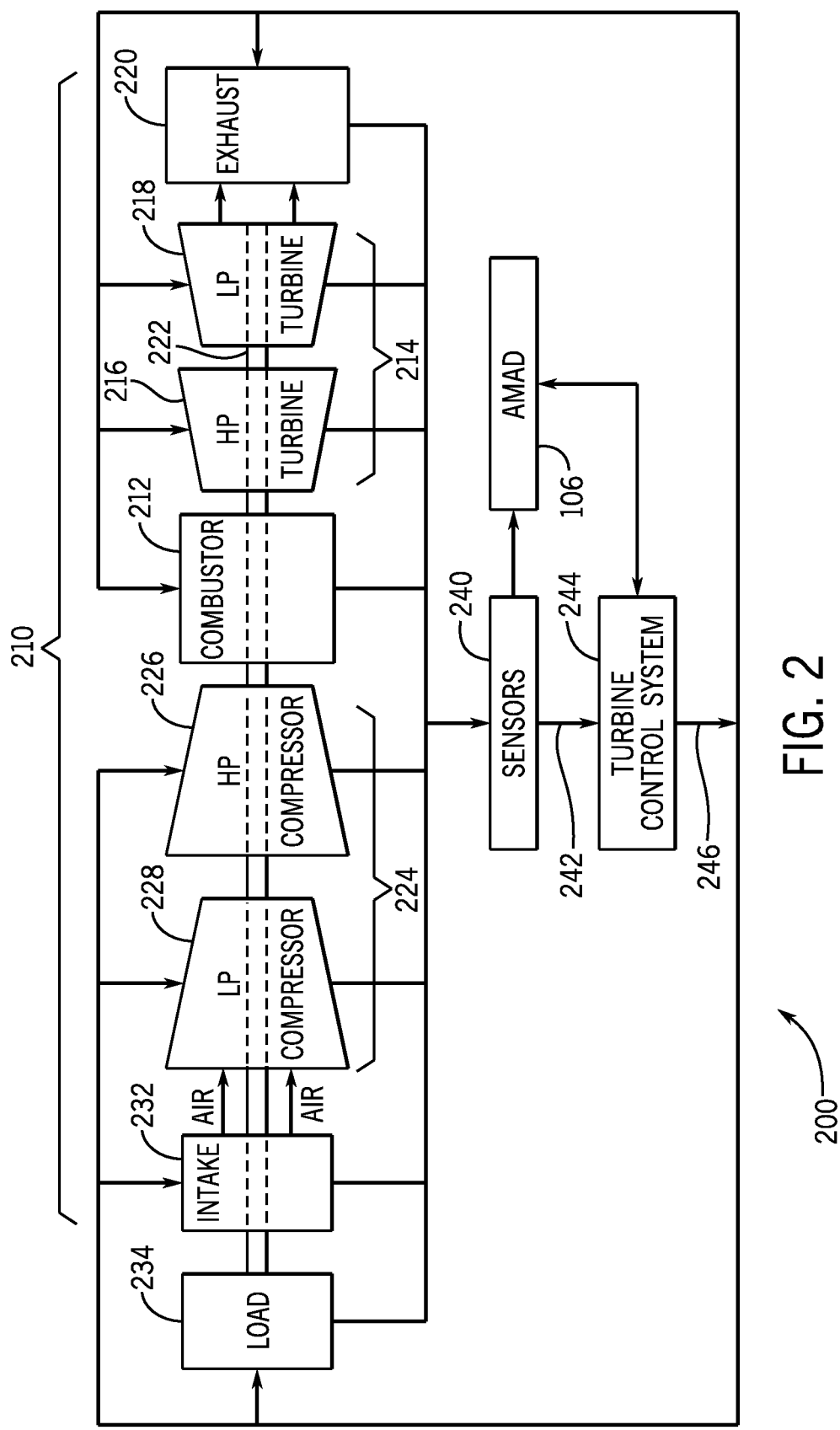
FIG. 2 is a block diagram depicting an embodiment of a system including a gas turbine engine, sensor(s), and the control system of FIG. 1, in accordance with an embodiment.

FIG. 2 is a block diagram depicting an embodiment of a power production system 200 (e.g., machine 102) which is depicted as including a turbine system, sensor(s) (e.g., sensor(s) 106), and a turbine control system (e.g., control system 110) as described with respect to FIG. 1. A turbine system 210 includes two gas turbine engines 216 and 218, which may use liquid or gas fuel, such as natural gas and/or a hydrogen rich synthetic gas, to run the turbine system 210. For instance, fuel nozzles may spray a fuel supply, mix the fuel with an oxidant (e.g., air), and distribute the oxidant-fuel mixture into a combustor 212. The combustion of the oxidant-fuel mixture may create hot pressurized gases within the combustor 212, which may be directed through a turbine section 214 that includes a high-pressure (HP) turbine engine 216 and a low-pressure (LP) turbine engine 218, and towards an exhaust 220. In the illustrated embodiment, the HP turbine engine 216 engine may be part of a HP rotor section, and the LP turbine engine 218 may be part of a LP rotor section of the turbine section 214. As the exhaust gases pass through the HP turbine engine 216 and LP turbine engine 218, the gases may force turbine blades to rotate a drive shaft 222 extending along a rotational axis. As illustrated, drive shaft 222 is connected to various components of the turbine system 210, including a HP compressor 226 and a LP compressor 228.

The drive shaft 222 of the turbine system 210 may include one or more shafts that may be, for example, concentrically aligned. The drive shaft 222 may include a shaft connecting the HP turbine engine 216 to the high-pressure compressor 226 of a compressor section 224 of the turbine system 210 to form a HP rotor. For example, the HP compressor 226 may include compressor blades coupled to the drive shaft 222. Thus, rotation of turbine blades in the HP turbine engine 216 may cause the shaft connecting the HP turbine engine 216 to the HP compressor 226 to rotate the compressor blades within the HP compressor 226, which compresses air in the HP compressor 226. Similarly, the drive shaft 222 may include a shaft connecting the LP turbine engine 218 to a low-pressure compressor 228 of the compressor section 224 to form a LP rotor. Thus, in the illustrated embodiment, the drive shaft 222 may include both an HP and an LP rotor for driving the HP compressor/turbine components and the LP compressor/turbine components, respectively. The LP compressor 228 may include compressor blades coupled to the drive shaft 222. Thus, rotation of turbine blades in the LP turbine engine 218 causes the shaft connecting the LP turbine 218 to the LP compressor 228 to rotate compressor blades within the LP compressor 228.

The rotation of compressor blades in the HP compressor 226 and the LP compressor 228 may act to compress air that is received via an air intake 232. As shown in FIG. 2, the compressed air is fed to the combustor 212 and mixed with fuel to allow for higher efficiency combustion. Thus, the turbine system 210 may include a dual concentric shafting arrangement, wherein LP turbine engine 218 is drivingly connected to LP compressor 228 by a first shaft of the drive shaft 222, which the HP turbine engine 216 is similarly drivingly connected to the HP compressor 226 by a second shaft in the drive shaft 222, which may be disposed internally and in a concentric arrangement with respect to the first shaft. In the illustrated embodiment, the shaft 222 may also be connected to load 234, which may include any suitable device that is powered by the rotational output of turbine system 210. For example, the load 234 could include a vehicle or a stationary load, such as an electric generator in a power plant or a propeller on an aircraft. In some embodiments, the turbine system 210 may be an aeroderivative gas turbine used in marine propulsion, industrial power generation, and/or marine power generation applications. Further, it should be noted that while the turbine system depicted in FIG. 2 is a representation of a cold-end system (e.g., the load 234 is disposed upstream from the intake with respect to the air flow direction), other embodiments may also include hot-end systems (e.g., with the load 234 being disposed downstream from the exhaust 220 with respect to the air flow direction).

To provide turbine performance information to a turbine control system 244, the gas turbine system 210 may include a set of sensors 240, wherein the sensors 240 are configured to monitor various turbine engine parameters related to the operation and performance of the turbine system 210. The sensors 240 may include, for example, one or more inlet sensors and outlet sensors positioned adjacent to, for example, the inlet and outlet portions of the HP turbine engine 216, the LP turbine 218, the HP compressor 226, the LP compressor 228, and/or the combustor 212, as well as the intake 232, the exhaust 220, and/or the load 234. Further, the sensors 240 may include measured and/or virtual sensors. As can be appreciated, a measured sensor may refer to a physical sensor (e.g., hardware) that is configured to acquire a measurement of a particular parameter(s), whereas a virtual sensor may be utilized to obtain an estimation of a parameter of interest and may be implemented using software. In some embodiments, virtual sensors may be configured to provide estimated values of a parameter that is difficult to directly measure using a physical sensor.

By way of example, these various inlet and outlet sensors 240, which may include measured and virtual sensors, may sense parameters related to environmental conditions, such as ambient temperature and pressure and relative humidity, as well as various engine parameters related to the operation and performance of the turbine system 10, such as compressor speed ratio, inlet differential pressure, exhaust differential pressure, inlet guide vane position, fuel temperature, generator power factor, water injection rate, compressor bleed flow rate, exhaust gas temperature and pressure, compressor discharge temperature and pressure, generator output, rotor speeds, turbine engine temperature and pressure, fuel flow rate, core speed. The sensors 240 may also be configured to monitor engine parameters related to various operational phases of the turbine system 210.

The measurements 242 of turbine system parameters obtained by the sensors 240 may be provided to the turbine control system 244, which is configured to perform monitoring, analysis, diagnostic, and regulating tasks on the turbine system 210. The turbine control system 244 may use local and/or cloud based processor(s) and/or memory (e.g., processor(s) 114, memory 116) and predetermined routines (stored in computer-readable medium) to process and analyze the measurements 242 received, run diagnose, and generate control signals 246 based on analytic and diagnostic results. The control signals 246 are sent to the corresponding components of the turbine engine 210 and the load 234 for performing new tasks.

The turbine control system 244 may include a local control system (e.g., located inside a control room close to the turbine system 210). For example, the local control system, either directed by an operator or operating in an automatic mode, may adjust actuators within the turbine system 210 to regulate the function of the turbine system 210 by changing parameters such as fuel flow rate, vane angle, and nozzle area. The actuators may include mechanical, hydraulic, pneumatic, or electromagnetic actuators that manage the movement of valves controlling air and fuel flow within air and fuel flow paths of the turbine system 210.

The turbine control system 244 may also include a cloud-based (or network-based) monitoring, analysis, and diagnostic system, which will be detailed below with respect to FIG. 3. The cloud-based monitoring, analysis, and diagnostic system may use the measurements 242 obtained by the sensors 240 to monitor remotely the performance of the turbine system 210, to run data analysis and simulation(s) to predict component failure and avoid service interruption, and to perform intelligent diagnostics for troubleshooting. The cloud-based monitoring, analysis, and diagnostic system enables convenient and remote access to the turbine system 210. For example, the turbine system 210 may be a gas turbine generator system (GTG) installed on a remote and isolated offshore oil rig. By using the cloud-based monitoring, analysis, and diagnostic system, the operator may remotely manage, direct, and regulate GTG operations without being physically proximity to the GTG.

Figure 3:
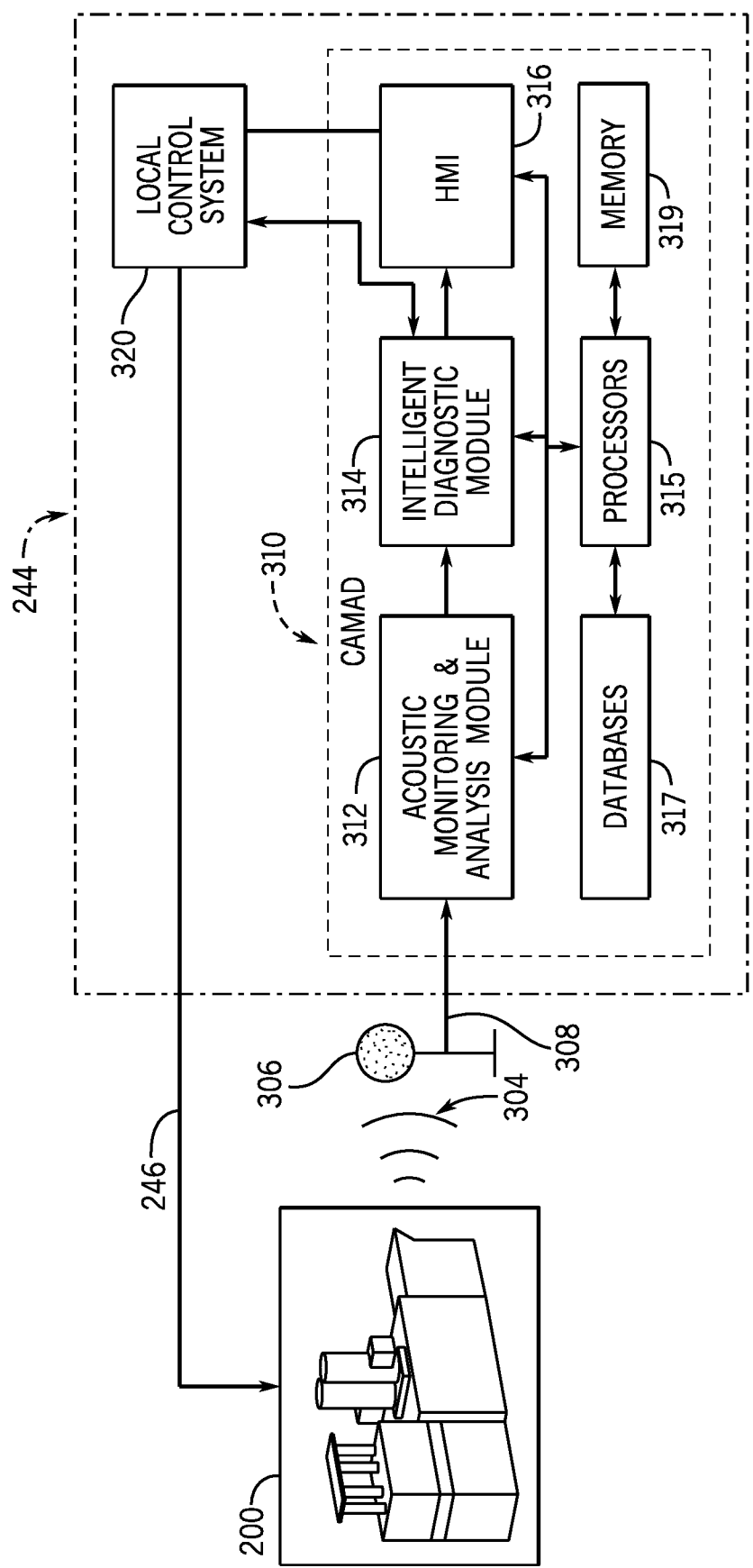
FIG. 3 is a schematic diagram of an embodiment of a cloud-based acoustic monitoring, analysis, and diagnostic (CAMAD) system that may be used by a power generation system, such as the gas turbine engine of FIG. 2, in accordance with an embodiment.

FIG. 3 illustrates schematic diagram of an embodiment of an acoustic monitoring, analysis, and diagnostic system, which in some embodiments, may be a cloud-based acoustic monitoring, analysis, and diagnostic (CAMAD) system 310 that may be used by the power generation system 200 that may include the gas turbine system 210 of FIG. 2. The power generation system 200 may include the turbine system 210 and an electric generator (e.g., load 234). During operations, the power generation system 200 may generate certain noises 304 (e.g., disordered sound waves), which may be detected by microphones 306 (acoustic sensors for converting sound waves into electrical signals) deployed in predetermined positions. Recorded acoustic signals 308 may then be routed to the turbine control system 244, which may include the CAMAD system 310 and a local control system 320. In other embodiments, the CAMAD system 310 may be a system separate from the control system 244 but communicatively and/or operatively coupled to the control system 244. The recorded acoustic signals 308 may be calculated, processed, and analyzed by the CAMAD system 310. The processed/analyzed data information may be used to predict and detect unwanted events that may call for planning maintenance, repair, and/or other services to improve operational uptime and minimize downtime, thus improving productivity. Based on the processed/analyzed data information, the turbine control system 244 may generate the control signals 246 and send the control signals 246 to the power generation system 200 for performing new tasks. For example, one of the control signals 246 may instruct the intake 232 to adjust the air supply rate, fuel, flame characteristics, and so on, of the air-fuel mixture combusted by the combustor 212.

The noise 304 may be generated from the turbine system 210 (e.g., fans or pumps), the generator (e.g., motors), or supplementary parts/equipment (e.g., connecting pipes or turbine enclosure) or any subsystem of the power production system 200. In some circumstances, the source of the noise 304 may be easily identified. For example, the noise 304 may be caused by instabilities observed when a mechanical part is vibrating or otherwise shaking in an undesired manner. In some other circumstances, the source of the noise 304 may be more complex. For example, the noise 304 may be caused by a structural or acoustic resonance condition, such as an acoustic resonance, a vibration resonance, and/or turbulence.

As illustrated, the noise 304 may be captured by the microphones 306. Microphones may be used as an acoustic wave sensor that detects audio by converting sound waves into electrical signals. The microphones 306 depicted may be used to capture acoustic waves (i.e., noise 304) from the components of the power generation system 200 at certain locations and may convert the captured acoustic waves into the recorded acoustic signals 308. The positions of microphones 306 may be determined, for example, by engineers and/or operators who install, operate, and maintain the power generation system 200. Positioning the microphones 306 may include determining more critical and/or "noisy" components of the power generation system 200 that need monitoring over the time and determining appropriate locations to deploy the microphones 306 to monitor noise performance for the respective components.

After detecting and converting the noise 304 into the recorded acoustic signals 308, the microphones 306 and/or related recording equipment may send the recorded acoustic signals 308 to the CAMAD 310. The CAMAD 310 may include hardware and software systems used to monitor remotely the noise performance of the power generation system 200. The CAMAD 310 may include data (signal) processing related components, such as an acoustic monitoring and analysis module 312, an intelligent diagnostic module 314, and one or more processors 315. The CAMAD 310 may also include storage related components, such as one or more databases 317 and memory 319. In addition, the CAMAD 310 may include a user interface, such as a Human Machine Interface (HMI) 316 to facilitate operational controls.

The acoustic monitoring and analysis module 312 may collect, process, and analyze the recorded acoustic signals 308 via one or more processors 315. The processed and analyzed data may be used to monitor the noise performance of the power generation system 200, and to provide early failure detection and preparation for services or replacements to eliminate operation downtime and increase productivity. The data processing and analysis may be executed by using pre-determined routines stored in the memory 319 (e.g., computer programs). The collected and processed data may be categorized, tagged, and stored into one or more databases 317. For example, data tags may be used as identifications by one or more processors 315 to cause the data to be stored to an appropriate location in one or more databases 317.

The data processing and analysis performed by the acoustic monitoring and analysis module 312 may include using different filtering techniques to remove unwanted noise(s) (such as background noise or ambient noise), thus increasing the possibilities of detecting the concerned noise(s). The filtering may be conducted in a time (e.g., using a random noise filter, a finite impulse response filter, or an adaptive filter) and a frequency domain (e.g., using a band-pass filter or a harmonic filter). The data processing and analysis may also include using the fast Fourier transform (FFT), which may convert a signal from its original domain (e.g., time) to a representation in the frequency domain and vice versa. Fourier analysis may provide system and component noise signature of the power generation system 200, which may be used for instant root cause analysis. The data processing and analysis may further include other audio signal processing techniques. For example, active noise control may be used to reduce unwanted noise. By creating a signal that is representative, and in some cases, identical to the unwanted noise but with the opposite polarity, the two signals may cancel out due to destructive interference.

Based on the recorded acoustic signals 308 and the processed data output from the acoustic monitoring and analysis module 312, the intelligent diagnostic module 314 may predict future system/component failure and avoid service interruption caused by such failures. The prediction of system/component failure may use computer simulations approximately imitating the operation of the power generation system 200 or the components of the power generation system 200 (e.g., the combustor 212, HP turbine engine 216, or exhaust 220) over time. For example, thermodynamic models, finite element analysis models (FEA), Computational Fluid Dynamics (CFD), chemical models, combustion models, and so on, may be used that model behavior for the power generation system 200 and resultant noise. The computer simulations may provide different noise levels and/or sound patterns by using the recorded acoustic signals 308 and/or synthetic signals under different operational circumstances (e.g., turbine ramp up, turbine baseload, turbine shutdown). For example, the different noise levels may be created during computer simulations, including noise levels in low load operation mode and high load operation mode.

To provide the early failure detection and root cause analysis, the sources of the noise are to be identified via the CAMAD 310. Identifying the sources of the noise 304 may include conducting noise measurements during controlled testing runs of power generation system 200 (e.g., during initial installation tests). The noise measurement procedures may include quantifying the noise levels, defining where and under what operating condition the noise 304 occurs, and defining its characteristics (such as dominant or signature frequency/frequencies using Fourier analysis, neural network training based on identifying certain noise patterns, and the like).

Next, the procedures may include analyzing the noise 304 based on noise characteristics such as signature frequencies. Acoustic signature-based analysis may use the frequency spectrum (e.g., in a range between 50 Hz to 12 KHz, produced by FFT) to distinguish different noise patterns. The signature frequencies of pre-determined noises (such as those from the computer simulations, and/or from controlled testing runs of power generation system 200), or combination of the signature frequencies may be used for analyzing the noise 304.

For example, the acoustic signature-based analysis may reveal that the noise 304 has a low frequency tone (about 60 Hz or lower) prognoscative of the combustor 212 instability problem(s). Multichannel measurements (such as in-flow acoustic measurements using the microphones 306, which may be split into different groups and configured to detect acoustic waves coming from different directions) may be used to determine the traveling direction of the noise 304. The travel direction of the noise 304 may be the same as the exhaust flow direction, the opposite direction, or stationary (a standing wave). If the measurement shows the traveling direction of the noise 304 is the same as the exhaust flow direction, the combustor 212 may be the source. The other two possibilities (the opposite direction and stationary) may indicate that the exhaust 220 causes the problem.

In a second example, the noise spectrum (e.g., frequency contents) may indicate the noise 304 is a mid or high frequency tone (higher than 60 Hz) related to aerodynamic phenomena of the exhaust 220, such as vortex shedding or turbulent buffeting resulted from acoustic or structural vibration resonance. Identifying acoustic resonances may entail in-flow acoustic measurements using the microphones 306 at strategic locations in the exhaust 220. Identifying possible vibration resonances may include using impulse response testing, calculations and/or computer simulations that may help to identify structural elements involved in the vibration resonance issue.

In a third example, the noise spectrum of the noise 304 may include a broadband noise profile caused by turbulence, which may be caused by the turbines (such as HP turbine engine 216 and LP turbine engine 218), the exhaust 220, or a combination thereof. Model-based simulation, such as thermodynamic models, finite element analysis models (FEA), Computational Fluid Dynamics (CFD) simulation, may help to identify the root cause of the turbulence (e.g., increased airflow rate).

In addition to responses to real time data recording/analysis, the CAMAD 310 may also continuously log the real time data into one or more databases 317. Using the historical data from continuous recording, the CAMAD 310 may detect and recognize deviation from the typical noise profile and grow or otherwise add to the profile data for future reference. Continuously monitoring and/or logging of the collected data may enable operators to recognize the change for early failure detection based on the analysis of historical data over the life time of the monitored system/component (e.g., baseline signatures recorded during system initiation may be used to track the system/component over the time as the system/component signatures deviate from the initial baseline). Maintaining real-time, continuous monitoring of noise levels may aid the operators of the power generation system 200 in complying with different safety/environment requirements, such as Environment, health and safety (EHS), Occupational Safety and Health Act (OSHA), European Union (e.g., Germany Technical Instructions on Noise Abatement (TA LARM)), New Zealand, and Australia requirements.

The HMI 316 may be used to visually display the data output from the acoustic monitoring and analysis module 312 and intelligent diagnostic module 314. By reviewing the displayed data from the HMI 316, the operators may monitor the performance of the power generation system 200 and track potential problems indicated by the intelligent diagnostic module 314. The operator may, via the HMI 316, interact with the acoustic monitoring and analysis module 312 or intelligent diagnostic module 314 to conduct further monitoring (e.g., over a longer time period), to execute advanced data processing (e.g., special filtering), and/or to execute diagnostic routines based on historical events. The operator may also, via the HMI 316, send instruction(s) to the local control system 320 to cause the power generation system 200 to preform intended operation(s) based on the instruction(s). In one or more embodiments, turbine control system 244 may include monitor(s) to facilitate the remote access of the CAMAD system 310. Additionally, or alternatively, the CAMAD may be monitored through a virtual machine in a cloud.

During operations, the operators of the power generation system 200 may continuously monitor the noise performance from both near field and far field. For example, operators may want lower or quieter near field noise limits due to contaminated high far field noise, or the operators may want far field guarantees for certain noises and/or noise levels without environmental noise pollution. The CAMAD system 310 may provide a more effective way to enable verifying the far field noise by continuously monitoring the data to find out if the noise is actually related to the power generation system 200 or affected by other noises from the environment.

Figure 4:
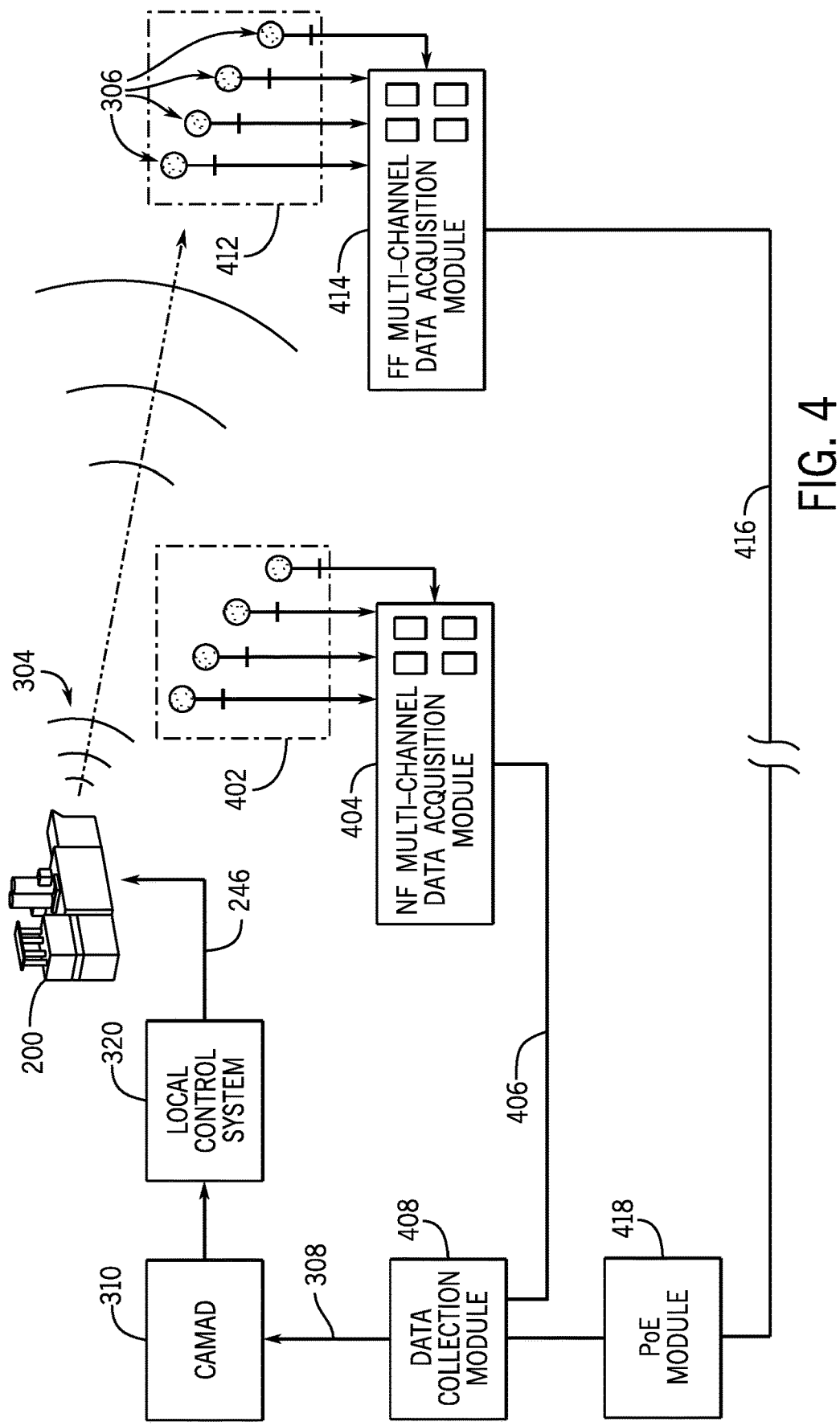
FIG. 4 is a schematic diagram showing a deployment diagram of near field and far field microphone arrays that may be used by the CAMAD system of FIG. 3, in accordance with an embodiment.

FIG. 4 illustrates schematically a deployment diagram of near field and far field microphone arrays that may be used by the CAMAD system 310. In this illustrated embodiment, a near field (NF) microphone array 402 and a far field (FF) microphone array 412 may be utilized to detect the noise 304 generated from the power generation system 200 in a near field and far field respectively. The near field may be limited to a distance from the source of sound (such as the power generation system 200), e.g., within 0-5 meters from the source of sound. The far field may begin at where the near field ends and extend to infinity (theoretically), e.g., between 5-20 meters, 5-100, 5-1000 meters, 5-2000 meters or more.

As previously discussed, microphone positions of the NF microphone array 402 and the FF microphone array 412 may be determined by the operators of the power generation system 200 based on operational, safety, or environmental requirements. For example, to obtain more reliable noise measurements from certain components of the power generation system 200, at least a portion of the NF microphone array 402 may be positioned inside the enclosure (e.g., building) of the turbine system 210. For another example, a residential area in the far field may be chosen as one of the positions of the FF microphone array 412 for such as when environment noise levels may be of concern.

Different and/or similar type of microphones may be used for the NF microphone array 402 and the FF microphone array 412. The NF microphone array 402 may be communicatively connected to a NF multi-channel data acquisition module 404 that may control data acquisitions of each microphone in the NF microphone array 402, data pre-processing (e.g., analog-to-digital signal conversion if signals sent from the NF microphone array 402 are not digital signals), and data communications between the NF multi-channel data acquisition module 404 and the CAMAD system 310. Similarly, the FF microphone array 412 may be communicatively connected to a FF multi-channel data acquisition module 414 that controls data acquisitions of each microphone in the FF microphone array 412, data pre-processing (e.g., analog-to-digital signal conversion if signals sent from the FF microphone array are not digital signals), and data communications between the FF multi-channel data acquisition module 414 and the CAMAD system 310.

The power and connectivity supporting the microphones (including NF and FF microphone arrays 402 and 412) and the data acquisition modules (including the NF and FF multi-channel data acquisition modules 404 and 414) may be different depending on the locations and/or the surrounding environment. For example, the NF multi-channel data acquisition modules 404 may be connected to a data collection module 408 via connection cable(s) 406 (e.g., coax cables). While the FF multi-channel data acquisition modules 414 may be first connected to a Power over Ethernet (PoE) module 418 via powered Ethernet cable(s) 416. The PoE module 418 may be further connected to the data collection module 408. In one or more embodiments, the output signals from the multi-channel data acquisition module 414 may be transmitted to the data collection module 408 wirelessly (e.g., via a wireless network). In such embodiment(s), the data collection module 408 and the multi-channel data acquisition module 414 may be equipped with components related to wireless communication to support wireless data transmissions.

The data collection module 408 may collect output signals via the NF and FF multi-channel data acquisition modules 404 and 414, transform the collected signals into the recorded acoustic signals 308, and transmit the recorded acoustic signals 308 to the CAMAD system 310 for further processing and analysis. Based on the processed/analyzed data, the local control system 320 may generate the control signals 246 and send the control signals 246 to the power generation system 200 for performing certain tasks or control actions. After completing the intended tasks, new noise performance may be evaluated by the operator of the power generation system 200 through the CAMAD system 310. The evaluations may compare real-time noise performance to the previous noise performance (i.e., before the completion of the intended tasks), which is part of the historical data from continuous recording. As described previously, the continuous recording may provide historical data for Root Cause Analysis (RCA) using system and component noise signatures at near field and far field.

The CAMAD system 310 may provide for synchronization mechanisms between the near field (NF) and the far field (FF). For example, the operators of power generation system 200 may desire lower NF noise ranges due to contaminated high far field noise. For example, the FF (e.g., 1 kilo-meter distance from power generation system 200) noise level may excess a pre-determined limit. Analysis from the CAMAD system 310 may show the NF noise level is still within the limit. Further, the diagnose from CAMAD system 310 may indicate the high FF noise level is due to a background noise, and there may be no indication showing the power generation system 200 caused the issue of high FF noise level. Therefore, no further action may be needed for the power generation system 200. Such observed events (e.g., high FF noise level above the limit) may be logged into one or more databases 317 for recording or further investigation.

In another example, a "rumble" noise detected by the FF microphone array 412 may be considered as a sign of a potential unexpected maintenance event for the power generation system 200. Analysis from the CAMAD system 310 may show the FF rumble noise has a signature frequency of around 100 Hz. However, the NF noise measurement logs recorded at the time when the FF rumble noise was detected may show no evidence of that a similar noise pattern has been captured by the NF microphone array 412. Further investigation may reveal that the rumble noise was generated by a nearby vibrating source in the far field.

Figure 5:
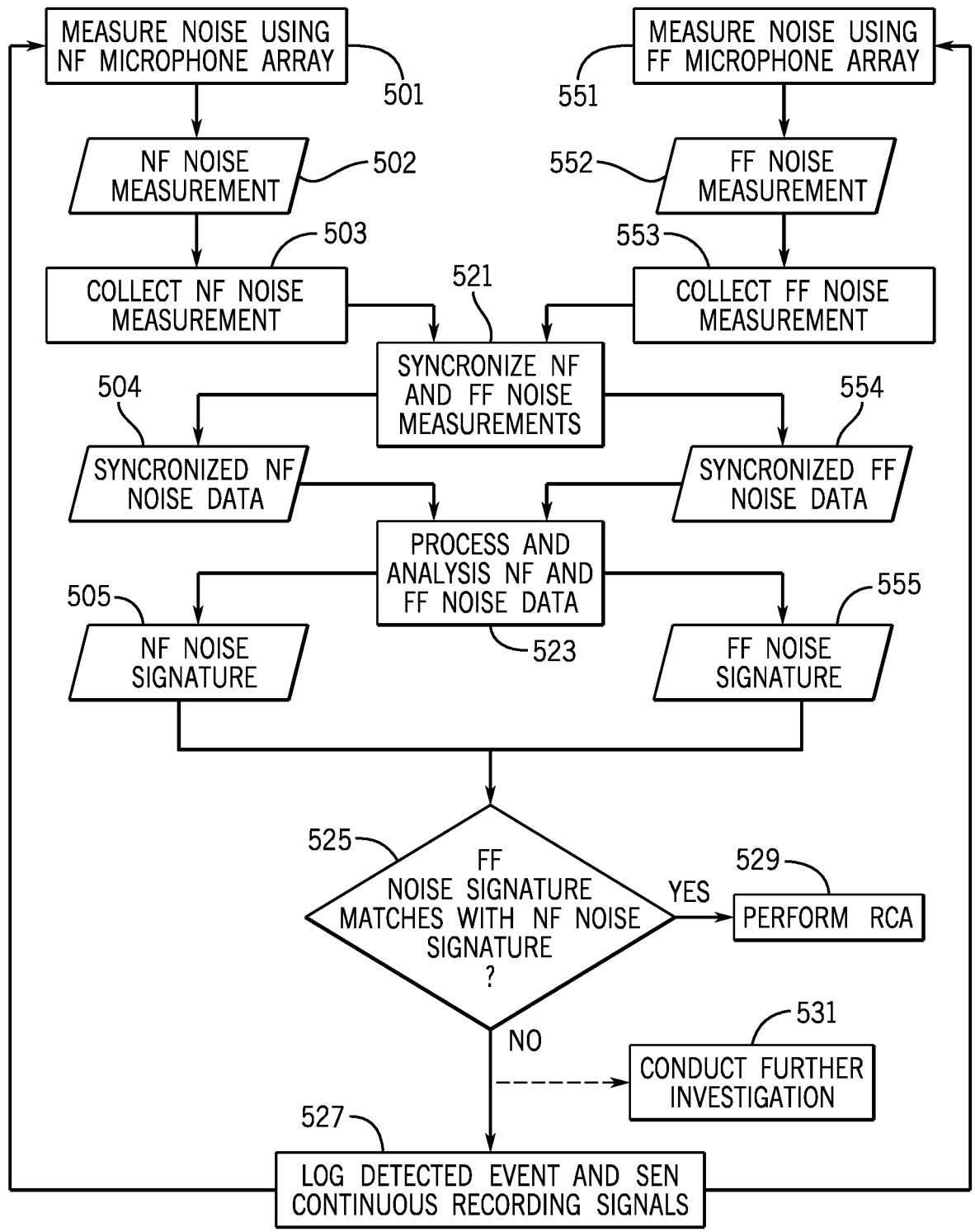
FIG. 5 is a flow diagram of a process that may analyze acoustic measurements using the near field and far field microphone arrays of FIG. 4, in accordance with an embodiment.

FIG. 5 illustrates a flow diagram of a process 500 suitable for processing acoustic signals communicated from the near field and far field microphone arrays 402 and 412 of FIG. 4. The process 500 may be implemented as computer instructions or code executable by the processor(s) 144 and stored in the memory 116. The NF microphone array 402 may measure or otherwise transmit signals representative of the noise 304 generated from the power generation system 200 (block 501). The NF multi-channel data acquisition module 404 may be used to control the NF noise measurement process and send NF noise measurement 502 to the data collection module 408. Similarly, the FF microphone array 412 may measure or otherwise transmit signals representative of the noise 304 generated from the power generation system 200 (block 551). The FF multi-channel data acquisition module 414 may be used to control the FF noise measurement process and send FF noise measurement 552 to the data collection module 408. The data collection module 408 may collect the NF noise measurement 502 (block 503) and the FF noise measurement 552 (block 553), respectively, and send collected measurements to the CAMAD system 310.

The CAMAD system 310 may synchronize the NF noise measurement 502 and FF noise measurement 552 (block 521) before performing processing, analysis, and further diagnosis. Data synchronization may be used to synchronize data between NF and FF noise measurements, and to update changes automatically between the NF and FF noise measurements, for example, to maintain data consistency within the CAMAD system 310. Synchronized NF noise data 504 and synchronized FF noise data 554 may be logged into one or more databases 317. The synchronization may tie the NF noise measurement 502 to the FF noise measurement 552 using data identifiers (e.g., tags) so that the following data processing and analysis may locate appropriate data blocks in one or more databases 317 using the data identifiers embedded into the synchronized NF noise data 504 and synchronized FF noise data 554. For example, the data identifiers may include tags that include the times when the NF/FF noise measurements were recorded, locations for the recordings, ambient data for the recordings (e.g., pressure, temperature, humidity). The tags may be used by the CAMAD system 310 to locate, for a detected noise pattern shown in the FF noise measurement 552, the corresponding NF noise measurement 502 that has matched time tags to the FF noise measurement 552.

The CAMAD system 310 may perform the data synchronization with the data collection module 408. Different synchronization options may be implemented depending on deployments of the NF and FF microphone arrays 402 and 412. For example, the synchronization options may include using data processor time embedded in a local data processor (e.g., data processor in the data collection module 408), GPS time, IEEE 1588 protocol, other suitable synchronization protocols, or combinations thereof. As mentioned earlier, environmental parameters such as temperature, pressure, humidity, and so on, may also be logged with the time.

After the data synchronization, the CAMAD system 310 may process and analyze the synchronized NF noise data 504 and the synchronized FF noise data 554 (block 523) to create NF noise signature 505 and the FF noise signature 555. As described previously, the data processing may include using different filtering techniques to remove unwanted noise(s) in time and/or frequency domain, such as using random noise filters, finite impulse response filters, adaptive filters, band-pass filter, harmonic filters, other suitable signal processing techniques, or combinations thereof. Based on the processed data, noise signatures may be created using the Fourier-based analysis in the frequency domain. Noise signatures may also be created via deep learning, for example by training one or more neural networks on baseline data. Likewise, noise signatures may be created via other techniques such as data mining (e.g., creating baseline noise clusters as signatures), state vector machine training, via expert systems (e.g., a human expert providing rules, including fuzzy rules, that define a baseline), and so on.

During operations of the power production system 200, the NF noise signature 505 and the FF noise signature 555, combined with other data (such as data identifiers), may be used by the CAMAD system 310 to detect certain events (decision 525) that may provide indications of potential issues that may lead to unwanted maintenance. For instance, the detected events may be related to vibrations and noises caused by a shifting of certain component of the power generation system 200. The CAMAD system 310 may compare a detected noise pattern identified by the FF noise signature 555 in data analysis of the FF noise measurement 552, to a similar noise pattern identified by the NF noise signature 505 in data analysis of the NF noise measurement 502 (block 525), which has matched tags (e.g., time tags) to the FF noise measurement 552. If the detected noise pattern identified by the FF noise signature 555 matches with the noise pattern identified by the NF noise signature 505, the CAMAD 310 may perform Root Cause Analysis (RCA) (block 529) using the FF noise signature 555, the NF noise signature 505, and other system and/or component noise signatures at near field and far field. The CAMAD 310 may also generate warning message or alert to notify operators of the power generation system 200 and display the result from the RCA (if available). The warning message, alert, and RCA result may be displayed via HMI 316, and/or other suitable devices.

If, for the detected noise pattern shown in the FF noise measurement 552, the FF noise signature 555 cannot match (decision 525) with the NF noise signature 505, the CAMAD 310 may log a detected event (e.g., noise pattern shown in the FF noise measurement 552) into one or more databases 317 for future reference, and/or send continuous recording signals to the NF and FF microphone arrays 402 and 412 to continuously measure the noise 304 and update the database 317. In one or more embodiments of the process 500, the CAMAD 310 may be used for further analysis. The further analysis may use measurements from other type(s) of sensing device(s)/system(s) based on other physical aspects (e.g., non-acoustic changes) of the power generation system 200. Different sensor types may be used in addition to the microphones, including pressure sensor, temperature/thermal sensor, vibration sensor, position sensor, optical sensor, and/or the like. The additional sensing devices may be incorporated to the monitoring system (e.g., the CAMAD system 310) to provide additional information of the monitored power generation system 200. For example, an abnormal noise pattern may be detected by the NF microphone array 402 surrounding the power generation system 200. The CAMAD system 310 may further check vibration sensors deployed around the power generation system 200 to identify any abnormal vibration being detected. In addition, the CAMAD system 310 system may check optical sensors to verify certain alignments (e.g., alignments between stationary and rotating or components), which may indicate that certain component of the power generation system 200 have shifted, generating vibrations and noises detected by the vibration sensors, optical sensors, and microphones. In another example, a fuel pump used to operate the power generation system 200 may have a leakage. A pressure sensor may detect a pressure drop while the pump continues running and transmit the pressure drop to the CAMAD system 310. The CAMAD system 310 may check the noise signatures from the NF noise signature 505 and/or the FF noise signature 555 for further verification to minimize or eliminate false alarm caused by pressure sensor malfunction.

A power system including a turbine engine (e.g., the power generation system 200 including a gas turbine engine) is used as an example embodiment in present disclosure, however, it should be understood that the techniques presented herein is not intended to be limited to the turbine generator systems/packages. The disclosed techniques may be used to other types of power generation systems or turbomachinery that have noise generating components (e.g., fans, pumps, compressors, motors, turboexpanders, and so on) that may be monitored by using acoustic sensors, other suitable sensing devices, or combinations thereof.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:
1. A system, comprising:
an acoustic monitoring, analysis, and diagnostic system comprising a processor configured to:
receive NF noise signals from a near field (NF) microphone array, wherein the NF microphone array measures noises generated from a power generation system in a near field, wherein the power generation system comprises a turbine system inside an enclosure, wherein at least a portion of the NF microphone array is positioned inside the enclosure of the turbine system;
receive FF noise signals from a far field (FF) microphone array, wherein the FF microphone array measures noises generated from the power generation system in a far field;
derive NF noise measurements and FF noise measurements based on the signals;
synchronize the NF noise measurements and the FF noise measurements to create synchronized NF noise data and synchronized FF noise data;
analyze the synchronized NF noise data and synchronized FF noise data to create a NF noise signature and an FF noise signature;
diagnose one or more root causes of noises generated from the power generation system based on the NF noise signature and FF noise signature; and
report the one or more root causes of the noises generated from the power generation system.

2. The system of claim 1, wherein the diagnose the one or more root causes comprises continuously receiving noise signals to then synchronize the NF noise measurements and the FF noise measurements to create the synchronized NF noise data and the synchronized FF noise data; to then diagnose the one or more root causes of noises; and to then report the one or more root causes.

3. The system of claim 1, wherein the processor is configured to synchronize the NF noise measurements and the FF noise measurements by synchronizing data between the NF noise measurements and the FF noise measurements and updating changes automatically between the NF noise measurements and FF noise measurements.

4. The system of claim 1, wherein the processor is configured to create the NF noise signature and the FF noise signature by using Fourier-based analysis in a frequency domain.

5. The system of claim 1, wherein the near field comprises an area between 0 and 10 meters from the turbine system included in the power generation system, and the far field comprises an area between 10 and 10,000 meters from the turbine system included in the power generation system.

6. The system of claim 1, wherein the turbine system comprises a plurality of components including an intake section, a compressor, a combustor, a gas turbine, and an exhaust section, wherein the one or more root causes relate to one or more of the plurality of components.

7. The system of claim 6, wherein the processor is configured to diagnose the one or more root causes of noises at least by simulating noise levels and sound patterns under different operating conditions, and the different operating conditions comprise a turbine ramp up condition, a turbine baseload condition, a turbine shutdown condition, and a turbine load condition.

8. The system of claim 6, wherein the processor is configured to diagnose the one or more root causes of noises comprising noises indicative of resonant behavior, combustion instability, vibration, misalignment or shifting of components, fluid leakage, aerodynamic phenomena in the exhaust section, or any combination thereof.

9. The system of claim 1, comprising a control system configured to control power generation by an electric generator coupled to the turbine system of the power generation system, wherein the acoustic monitoring, analysis, and diagnostic system is included in the control system, or communicatively coupled to the control system.

10. The system of claim 9, wherein the control system is configured to apply the one or more root causes to adjust control of the power generation system to ameliorate noise.

11. The system of claim 1, wherein the acoustic monitoring, analysis, and diagnostic system comprises a cloud-based acoustic monitoring, analysis, and diagnostic system.

12. The system of claim 1, wherein the acoustic monitoring, analysis, and diagnostic system comprises an acoustic monitoring and analysis module configured to collect, process, and analyze the NF noise signals and the FF noise signals via the processor, and an intelligent diagnostic module configured to predict the power generation system and component failures and to help avoiding service interruption caused by the power generation system and component failures.

13. A method, comprising:
 measuring, via a near field (NF) microphone array, noises generated from a power generation system and traveling in the near field, wherein the power generation system comprises a turbine system inside an enclosure;
 receiving, via an acoustic monitoring, analysis, and diagnostic system, NF noise signals from the NF microphone array, wherein at least a portion of the NF microphone array is positioned inside the enclosure of the turbine system;
 measuring, via a far field (FF) microphone array, noises generated from the power generation system and traveling in the far field;
 receiving, via the acoustic monitoring, analysis, and diagnostic system, FF noise signals from the FF microphone array;
 deriving, via the acoustic monitoring, analysis, and diagnostic system, NF noise measurements and FF noise measurements based on the NF signals and the FF signals;
 synchronizing, via the acoustic monitoring, analysis, and diagnostic system, the NF noise measurements and the FF noise measurements into synchronized NF noise data and synchronized FF noise data;
 monitoring, via the acoustic monitoring, analysis, and diagnostic system, noise performance of the power generation system based on the NF noise measurements and FF noise measurements;
 analyzing, via the acoustic monitoring, analysis, and diagnostic system, the synchronized NF noise data and the synchronized FF noise data to create NF noise signature and FF noise signature;
 diagnosing, via the acoustic monitoring, analysis, and diagnostic system, root causes of the measured noises generated from the power generation system based on the NF noise signature and FF noise signature; and
 controlling, via the acoustic monitoring, analysis, and diagnostic system, the near field (NF) microphone array and far field (FF) microphone array to measure the noise continuously to generate continuous recorded acoustic signals that provide continuous monitoring of collected data to recognize a change for early failure detection based on the analysis of historical data over the life time of the monitored power generation system.

14. The method of claim 13, wherein synchronizing the NF noise measurements and the FF noise measurements is performed by synchronizing data between the NF noise measurements and the FF noise measurements and updating changes automatically between the NF noise measurements and the FF noise measurements.

15. The method of claim 13, wherein the NF noise signature and the FF noise signature are created using Fourier-based analysis in a frequency domain.

16. The method of claim 13, comprising controlling, via a control system, power generation of the power generation system, wherein the acoustic monitoring, analysis, and diagnostic system is included in the control system, communicatively coupled to the control system, cloud-based, or a combination thereof.

17. The method of claim 13, comprising applying, via a control system, the root causes to adjust control of the power generation system to ameliorate the noises generated from the power generation system.

18. Non-transitory, tangible, and computer-readable medium storing instructions that, when executed by one or more processors, are configured to cause the one or more processors to:
 control a near field (NF) microphone array configured to measure noises generated from a power generation system, wherein the power generation system comprises a turbine system inside an enclosure;
 control a far field (FF) microphone array configured to measure noises generated from the power generation system;
 receive NF noise measurements from the NF microphone array, wherein at least a portion of the NF microphone array is positioned inside the enclosure of the turbine system;
 receive FF noise measurements from the FF microphone array;
 synchronize the NF noise measurements and FF noise measurements to create synchronized NF noise data and synchronized FF noise data;
 monitor noise performance of the power generation system based on the measured noises from the NF microphone array and FF microphone array;
 analyze the synchronized NF noise data and synchronized FF noise data to create NF noise signature and FF noise signature;
 diagnose root causes of the measured noises generated from the power generation system based on the NF noise signature and FF noise signature; and
 control the near field (NF) microphone array and far field (FF) microphone array to measure the noise continuously to generate continuous recorded acoustic signals that enable continuous monitoring of collected data to recognize change(s) for early failure detection based on the analysis of historical data over the life time of the monitored power generation system.

19. The non-transitory, tangible, and computer-readable medium of claim 18, wherein the instructions, when executed, are configured to cause the one or more processors to control different sensors, in addition to the near field (NF) microphone array and far field (FF) microphone array, to measure additional information of the power generation system, wherein the different sensors includes pressure sensors, thermal sensors, vibration sensors, position sensors, optical sensors.

20. The non-transitory, tangible, and computer-readable medium of claim 19, wherein the additional information of the power generation system is related to the noises measured by the near field (NF) microphone array and far field (FF) microphone array.

21. The non-transitory, tangible, and computer-readable medium of claim 18, wherein the instructions, when executed, are configured to cause the one or more processors to create the NF noise signature and FF noise signature noise using Fourier-based analysis in the frequency domain, or using machine learning.

22. The non-transitory, tangible, and computer-readable medium of claim 18, wherein the historical data comprises previous noise performance that is compared to real-time noise performance of the power generation system.

* * * * *